United States Patent
Wang et al.

(10) Patent No.: US 8,305,721 B2
(45) Date of Patent: Nov. 6, 2012

(54) ELECTROSTATIC DISCHARGE PROTECTION DEVICE AND METHOD THEREOF

(75) Inventors: Shih-Yu Wang, Hsinchu (TW); Yan-Yu Chen, Hsinchu (TW); Yu-Lien Liu, Hsinchu (TW)

(73) Assignee: MACRONIX International Co., Ltd., Hsinchu (TW)

( * ) Notice: Subject to any disclaimer, the term of this patent is extended or adjusted under 35 U.S.C. 154(b) by 64 days.

(21) Appl. No.: 12/877,286

(22) Filed: Sep. 8, 2010

(65) Prior Publication Data

US 2012/0057258 A1    Mar. 8, 2012

(51) Int. Cl.
   *H02H 9/00*   (2006.01)
   *H02H 1/00*   (2006.01)
   *H02H 1/04*   (2006.01)
   *H02H 3/22*   (2006.01)
   *H02H 9/06*   (2006.01)

(52) U.S. Cl. .......................................... 361/56; 361/118

(58) Field of Classification Search ................. 361/56
   See application file for complete search history.

(56) References Cited

U.S. PATENT DOCUMENTS

| | | | |
|---|---|---|---|
| 6,989,979 B1 * | 1/2006 | Tong et al. | 361/91.1 |
| 7,154,719 B2 * | 12/2006 | Krasin | 361/56 |
| 2006/0250732 A1 * | 11/2006 | Peachey | 361/56 |
| 2008/0055805 A1 * | 3/2008 | Pong et al. | 361/56 |
| 2009/0195951 A1 * | 8/2009 | Sorgeloos et al. | 361/56 |

* cited by examiner

*Primary Examiner* — Dharti Patel
(74) *Attorney, Agent, or Firm* — J.C. Patents

(57) ABSTRACT

An electrostatic discharge protection device for protecting an inner circuit, which is operated in a source voltage, is provided and includes a protection unit and a control unit. The protection unit provides a discharge path for transmitting an electrostatic signal from a pad to a ground line. According to a voltage level at a control end, the protection unit adjusts a holding voltage and a triggering voltage determining whether to conduct the discharge path. When the source voltage is supplied, the control unit transmits the input voltage to the control end of the protection unit, so as to raise the holding and the triggering voltages of the discharge path. When the source voltage is not supplied, the control unit switches the control end of the protection unit to a floating condition by the electrostatic signal, so as to lower the holding and the triggering voltages of the discharge path.

15 Claims, 10 Drawing Sheets

ELECTROSTATIC DISCHARGE PROTECTION DEVICE AND METHOD THEREOF

BACKGROUND OF THE INVENTION

1. Field of the Invention

The invention relates to an electrostatic discharge (ESD) protection device and method thereof. More particularly, the invention relates to an ESD protection device capable of adjusting a holding voltage and a triggering voltage of a discharge path, and a method thereof.

2. Description of Related Art

Electrostatic discharge (ESD) is a phenomenon of releasing electrostatic charges from non-conductive objects. The phenomenon brings about damages to semiconductors and other circuits in integrated circuits. When a normal charged body (human beings walking on carpets, machines in package integrated circuits, or instrument for testing integrated circuits) comes into contact with an IC chip, the ESD occurs, which leads to a transient power surge that may damage the integrated circuits in chips irreparably.

In order to prevent damages caused by the ESD, ESD protection devices are designed and applied to the integrated circuits. There are various traditional designs of the ESD protection devices. One of them is the application of two n-type transistors connected in series for ESD protection. The bias voltage at the gates of the two-level n-type transistors stays constant. Nonetheless, a holding voltage of a discharge path is oftentimes less than 10.5 volts under the aforesaid structure. Hence, when an inner circuit operates, electrical overstress (EOS) frequently occurs due to the overly low holding voltage, which negatively affects operation of the inner circuit.

As a result, to properly design and form the ESD protection device without affecting normal operation of the inner circuit has become the main focus in the industry.

SUMMARY OF THE INVENTION

An embodiment of this invention is directed to an ESD protection device for precluding an inner circuit from being affected by an electrostatic signal and for ensuring normal operation of the inner circuit.

An embodiment of this invention is directed to an ESD protection method for precluding an inner circuit from being affected by an electrostatic signal.

In an embodiment of this invention, an ESD protection device for protecting an inner circuit is provided. The inner circuit is operated in a source voltage and receives an input voltage through a pad, and the ESD protection device includes a protection unit and a control unit. The protection unit provides a discharge path for transmitting an electrostatic signal from the pad to a ground line. Besides, the protection unit has a control end. According to a voltage level at the control end, the protection unit adjusts a holding voltage and a triggering voltage that determine whether to conduct the discharge path. On the other hand, when the source voltage is supplied, the control unit transmits the input voltage to the control end of the protection unit, such that the protection unit raises the holding voltage and the triggering voltage of the discharge path. When the source voltage is not supplied, the control unit switches the control end of the protection unit to a floating condition or a ground condition by means of the electrostatic signal, such that the protection unit lowers the holding voltage and the triggering voltage of the discharge path.

According to an embodiment of the invention, the control unit includes a first capacitor, a first n-type transistor, a first inverter, and an first isolating circuit. A first end of the first capacitor is electrically connected to the pad. A drain of the first n-type transistor is electrically connected to a second end of the first capacitor, a source of the first n-type transistor is electrically connected to the ground line, and a gate of the first n-type transistor receives the source voltage. The first inverter is disposed between the pad and the ground line, and an input end of the first inverter is electrically connected to the second end of the first capacitor. A first end of the first isolating circuit is electrically connected to an output end of the first inverter, and a second end of the first isolating circuit is electrically connected to the control end of the protection unit. The first end and the second end of the first isolating circuit are conducted when a voltage level at the first end of the first isolating circuit is greater than a voltage level at the second end of the first isolating circuit.

According to an embodiment of the invention, the control unit further includes a first p-type transistor. A source of the first p-type transistor is electrically connected to the pad, a drain of the first p-type transistor is electrically connected to the second end of the first capacitor, and a gate of the first p-type transistor is electrically connected to the output end of the first inverter.

According to an embodiment of the invention, the protection unit includes a third diode, a fourth n-type transistor, and a fifth n-type transistor. An anode of the third diode is electrically connected to the pad and the inner circuit. A drain of the fourth n-type transistor is electrically connected to a cathode of the third diode, and a gate of the fourth n-type transistor acts as the control end of the protection unit. A drain of the fifth n-type transistor is electrically connected to a source of the fourth n-type transistor, a source of the fifth n-type transistor is electrically connected to the ground line, and a gate of the fifth n-type transistor is coupled to the ground line.

In an embodiment of this invention, an ESD protection method for protecting an inner circuit is provided, wherein the inner circuit is operated in a source voltage and receives an input voltage through a pad. The ESD protection method includes following steps. A discharge path form the pad to a ground line is provided through a protection unit, and a holding voltage and a triggering voltage for determining whether to conduct the discharge path is adjusted based on a voltage level at a control end of the protection unit. When the source voltage is supplied, the input voltage is transmitted to the control end of the protection unit, so as to raise the holding voltage and the triggering voltage of the discharge path. When the source voltage is not supplied, the control end of the protection unit is switched to a floating condition or a ground condition by the electrostatic signal, so as to lower the holding voltage and the triggering voltage of the discharge path.

According to the embodiment of the invention discussed above, the control unit is employed in this invention to control the holding voltage and the triggering voltage of the discharge path which is provided by the protection unit. When the source voltage is supplied, the inner circuit is in a normal operation, and the control unit enables the protection unit to raise the holding voltage and the triggering voltage of the discharge path. Thereby, even though the inner circuit receives a high voltage from a pad, the occurrence frequency of the EOS is reduced because the holding voltage and the triggering voltage are increased. By contrast, when the source voltage is not supplied, the inner circuit stops operating, and the control unit enables the protection unit to lower the holding voltage and the triggering voltage of the discharge path.

As such, the protection unit can better eliminate the electrostatic signal when the holding voltage and the triggering voltage are lowered down.

It is to be understood that both the foregoing general description and the following detailed description are exemplary, and are not intended to limit the scope of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following descriptions, elements having identical or similar functions and structures in different embodiments are assigned with the same reference numbers and terms for consistency.

First Embodiment

Figure 1:
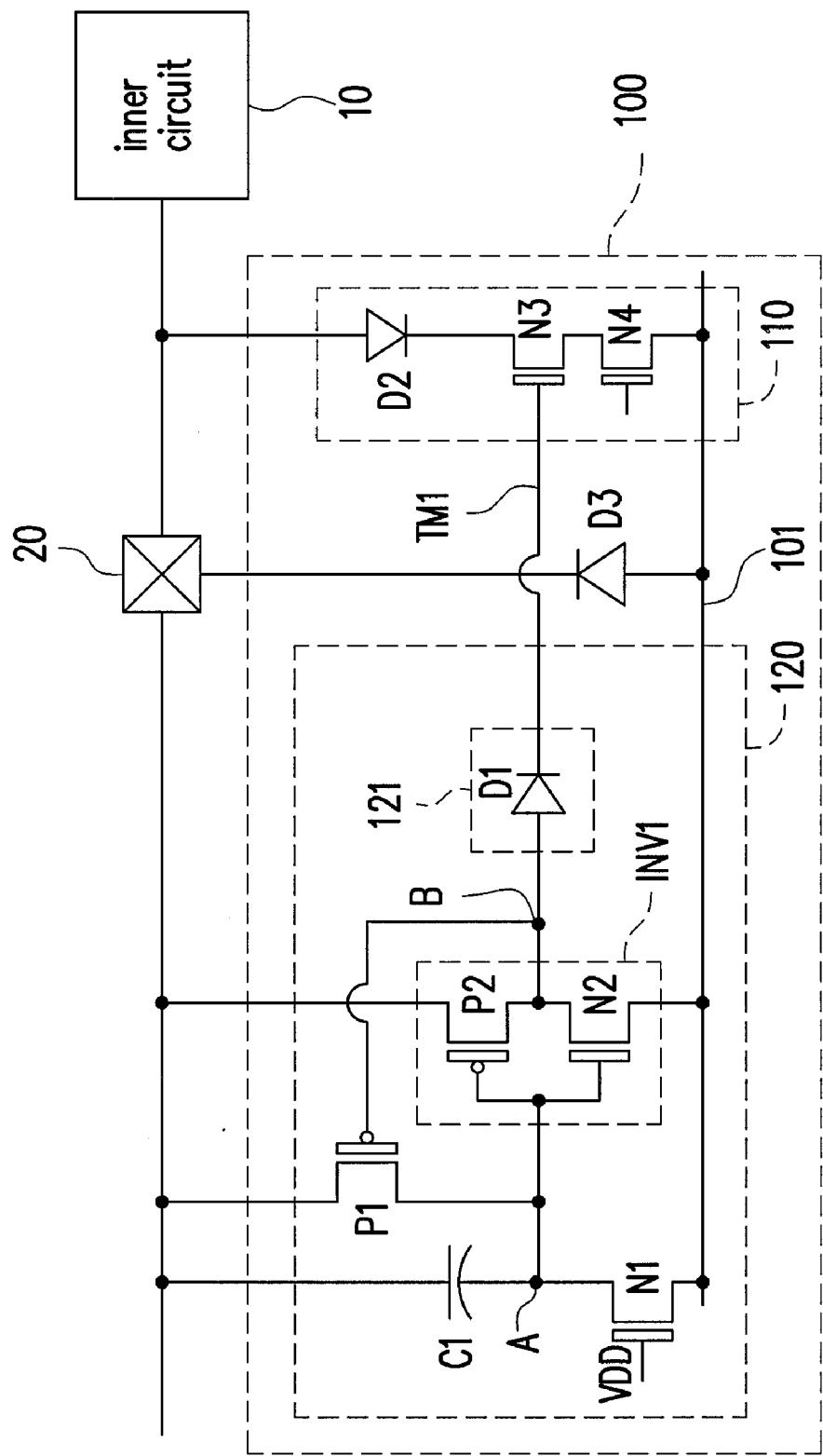
FIG. 1 is a schematic view illustrating a structure of an ESD protection device according to a first embodiment of the invention.

FIG. 1 is a schematic view illustrating a structure of an ESD protection device according to a first embodiment of the invention. In FIG. 1, an inner circuit 10 and a pad 20 are depicted. With reference to FIG. 1, the inner circuit 10 is operated in a source voltage and receives an input voltage through the pad 20. Furthermore, the ESD protection device 100 protects the inner circuit 10 from being damaged by an electrostatic signal.

The ESD protection device 100 includes a protection unit 110 and a control unit 120. Particularly, the protection unit 110 includes a diode D2, an n-type transistor N3, and an n-type transistor N4. An anode of the diode D2 is electrically connected to the pad 20 and the inner circuit 10. A drain of the n-type transistor N3 is electrically connected to a cathode of the diode D2, and a gate of the n-type transistor N3 acts as a control end TM1 of the protection unit 110. A drain of the n-type transistor N4 is electrically connected to a source of the n-type transistor N3, a source of the n-type transistor N4 is electrically connected to a ground line 101, and a gate of the n-type transistor N4 is coupled to the ground line 101.

In practice, when the source voltage VDD is supplied, the inner circuit 10 is in a normal operation. Besides, the n-type transistor N4, of which the gate is coupled to the ground line 101, can prevent the pad 20 from conducting the ground line 101 and can further preclude the ESD protection device 100 from generating a leakage current. Besides, the n-type transistors N3 and N4 that are connected in series have parasitic lateral NPN bipolar junction transistors. Therefore, when the source voltage VDD is not supplied, the inner circuit 10 stops operating. Besides, the electrostatic signal from the pad 20 can be transmitted to the ground line 101 through a discharge path formed by the parasitic NPN bipolar junction transistors. Thereby, damages caused by the electrostatic signal to the inner circuit 10 can be prevented.

Note that whether to conduct the discharge path formed by the parasitic NPN bipolar junction transistors is determined by the holding voltage and the triggering voltage. In addition, according to this embodiment, the protection unit 110 adjusts the holding voltage and the triggering voltage of the discharge path based on a voltage level at the control end TM1 of the protection unit 110. The voltage level at the control end TM1 of the protection unit 110 is controlled by the control unit 120. Operation of the control unit 120 is described hereinafter to elaborate how the protection unit 110 correspondingly adjusts the holding voltage and the triggering voltage of the discharge path under the control of the control unit 120.

As indicated in FIG. 1, the control unit 120 includes a capacitor C1, an n-type transistor N1, an inverter INV1, a p-type transistor P1, and an isolating circuit 121. A first end of the capacitor C1 is electrically connected to the pad 20. A drain of the n-type transistor N1 is electrically connected to a second end of the capacitor C1, a source of the n-type transistor N1 is electrically connected to the ground line 101, and a gate of the n-type transistor N1 receives a source voltage VDD of the inner circuit 10. The inverter INV1 is disposed between the pad 20 and the ground line 101, and an input end of the inverter INV1 is electrically connected to the second end of the capacitor C1. A source of the p-type transistor P1 is electrically connected to the pad 20, a drain of the p-type transistor P1 is electrically connected to the second end of the capacitor C1, and a gate of the p-type transistor P1 is electrically connected to an output end of the inverter INV1. A first end of the isolating circuit 121 is electrically connected to the output end of the inverter INV1, and a second end of the isolating circuit 121 is electrically connected to the control end TM1 of the protection unit 110.

In practice, when the source voltage VDD is supplied, the inner circuit 10 is in a normal operation, and the source voltage VDD of the inner circuit 10 is correspondingly transmitted to the gate of the n-type transistor N1. Here, the drain and the source of the n-type transistor N1 are conducted to each other, such that a voltage level at a node A is pulled to a ground voltage. On the other hand, the inner circuit 10 during operation receives the input voltage through the pad 20. Here, a voltage level at a node B is pulled to the input voltage by operating the inverter INV1, such that the isolating circuit 121 receives the input voltage.

For instance, in this embodiment, the inverter INV1 includes a p-type transistor P2 and an n-type transistor N2. A source of the p-type transistor P2 is electrically connected to the pad 20, a drain of the p-type transistor P2 acts as the output end of the inverter INV1, and a gate of the p-type transistor P2 acts as the input end of the inverter INV1. Besides, a drain of the n-type transistor N2 is electrically connected to the drain of the p-type transistor P2, a source of the n-type transistor N2 is electrically connected to the ground line 101, and a gate of the n-type transistor N2 is electrically connected to the gate of the p-type transistor P2. In practice, when the voltage level at the node A is pulled to the ground voltage, the p-type transistor P2 conducts its source and its drain, such that the voltage level at the node B is pulled to the input voltage.

In another aspect, the isolating circuit 121 conducts its first end and its second end when the voltage level at its first end is greater than the voltage level at its second end. In this embodiment, the isolating circuit 121 can be formed by a diode D1, for example. An anode of the diode D1 acts as the first end of the isolating circuit 121, and a cathode of the diode D1 acts as the second end of the isolating circuit 121. As such, when the isolating circuit 121 receives the input voltage, the isolating circuit 121 conducts its first end and its second end, such that the isolating circuit 121 pulls the voltage level at the control end TM1 of the protection unit 110 up to the input voltage approximately.

As the voltage level at the control end TM1 is raised, the protection unit 110 correspondingly raises the holding voltage and the triggering voltage of the discharge path. In other words, when the source voltage VDD is supplied, the holding voltage and the triggering voltage of the discharge path are correspondingly increased. Thereby, even though the inner circuit 10 receives a high voltage from the pad 20, the occurrence frequency of the EOS is reduced because the holding voltage and the triggering voltage are increased, so as to further guarantee normal operation of the inner circuit 10. By contrast, when the source voltage VDD is not supplied, the inner circuit 10 stops operating, and the inner circuit 10 does not receive the input voltage from the pad 20. Here, the inner circuit 10 may be affected by the electrostatic signal from the pad 20 instead. Note that the electrostatic signal from the pad 20 is transmitted to the drain of the n-type transistor N1 through the capacitor C1 when the source voltage VDD is not supplied and the ESD occurs. Besides, since the source voltage VDD is not transmitted to the gate of the n-type transistor N1, and thereby the drain and the source of the n-type transistor N1 are not conducted to each other.

Namely, the electrostatic signal is transmitted to the node A though the capacitor C1. Thereby, the voltage level at the node A is pulled up to a high voltage, while the voltage level at the node B is pulled down to the ground voltage by the inverter INV1. Here, the p-type transistor P1 is switched on to form a feedback mechanism maintaining the voltage level respectively at the node A and at the node B. It should be mentioned that the p-type transistor P1 is mainly used to enhance performance of the control unit 120, and therefore people having ordinary skills in the art can determine whether the p-type transistor P1 is removed based on actual needs.

When the voltage level at the node B is pulled down to the ground voltage, the isolating circuit 121 does not conduct its first end and its second end, and thereby the control end TM1 of the protection unit 110 is constantly in a floating condition. Since the control end TM1 of the protection unit 110 is constantly in the floating condition, the protection unit 110 correspondingly lowers the holding voltage and the triggering voltage of the discharge path. That is to say, when the source voltage VDD is not supplied, and when the ESD occurs, the holding voltage and the triggering voltage of the discharge path are correspondingly decreased. As such, the protection unit 110 can eliminate the electrostatic signal to a better extent when the holding voltage and the triggering voltage are lowered down, and the inner circuit 10 can be protected from being affected by the electrostatic signal.

Figure 2:
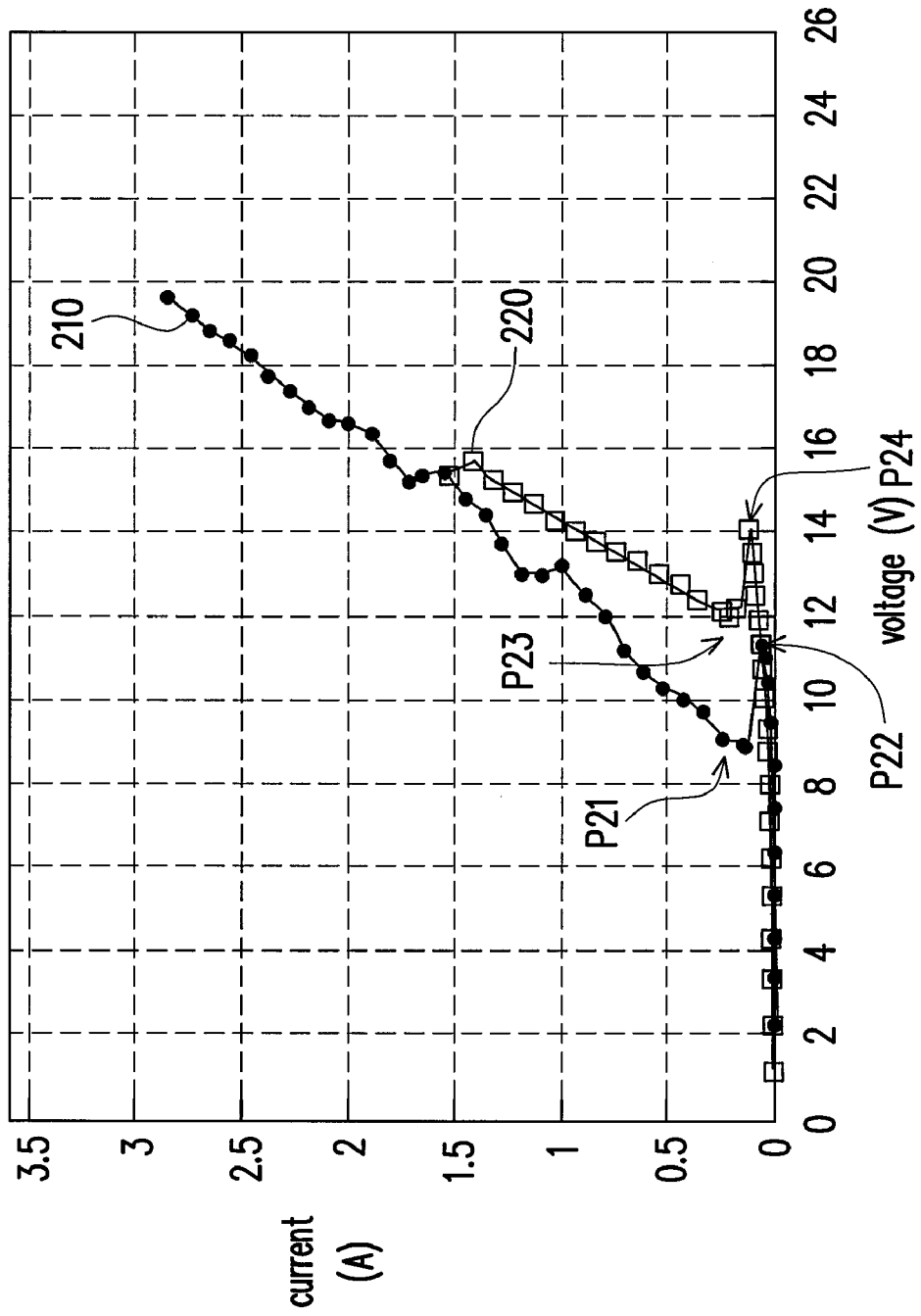
FIG. 2 is a curve chart showing the relationship between a voltage and a current of the protection unit.

FIG. 2 is a curve chart showing the relationship between a voltage and a current of the protection unit, wherein a curve 210 stands for the variations in the voltage and the current of the protection unit 110 when the source voltage VDD is not supplied, and the curve 210 stands for the variations in the voltage and the current of the protection unit 110 when the source voltage VDD is supplied. From FIG. 2, it can be learned that the holding voltage and the triggering voltage for determining whether to conduct the discharge path are correspondingly lowered down when the control end TM1 of the protection unit 110 is switched to the floating condition. For instance, as shown by the reference numbers P21 and P22, the discharge path defined by the curve 210 has the holding voltage at 8.6 volts and the triggering voltage at 11.3 volts approximately. On the other hand, the holding voltage and the triggering voltage for determining whether to conduct the discharge path are correspondingly raised when the control end TM1 of the protection unit 110 is switched to the input voltage (e.g. 10.5 volts). For instance, as shown by the reference numbers P23 and P24, the discharge path defined by a curve 220 has the holding voltage at 12.2 volts and the triggering voltage at 14 volts approximately.

It should be mentioned that the ESD protection device 100 of this embodiment further includes a diode D3. Here, a cathode of the diode D3 is electrically connected to the pad 20, and an anode of the diode D3 is electrically connected to the ground line 101. Thereby, the diode D3 reversely connected between the pad 20 and the ground line 101 can protect the inner circuit 10 from being affected by the electrostatic signal to a better extent. Nonetheless, the diode D3 should not be construed as a limitation to the invention, and people having ordinary skills in the art can determine whether the diode D3 is removed based on design needs.

Second Embodiment

Figure 3:
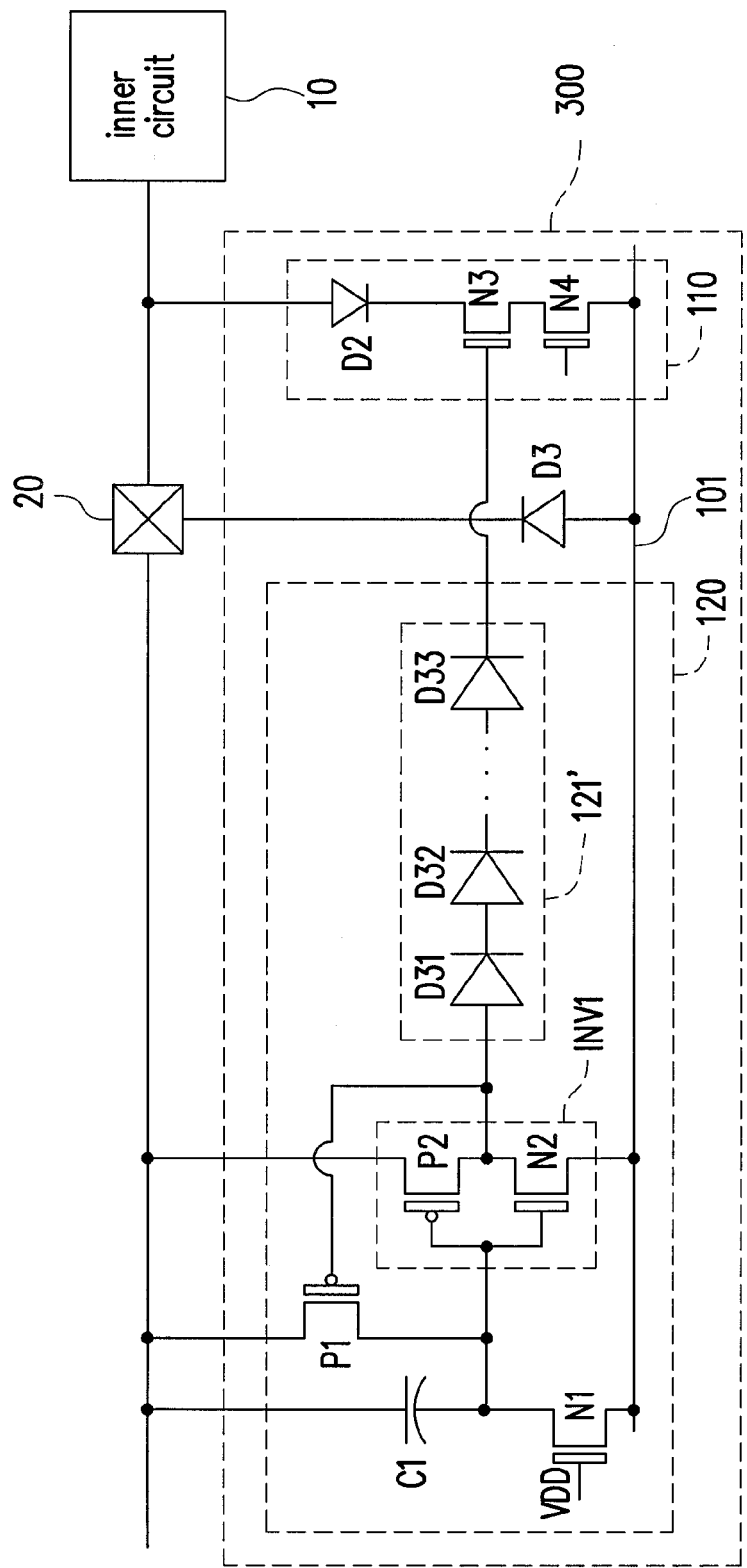
FIG. 3 is a schematic view illustrating a structure of an ESD protection device according to a second embodiment of the invention.

FIG. 3 is a schematic view illustrating a structure of an ESD protection device according to a second embodiment of the invention. Please refer to FIG. 3. This embodiment is substantially identical to the first embodiment, and the same or similar reference numbers used in this embodiment and in the first embodiment represent the same or similar elements. Accordingly, no further descriptions are provided in this embodiment.

The main difference between this embodiment and the first embodiment lies in that the isolating circuit 121' in the ESD protection device 300 as described in this embodiment is formed by a plurality of diodes D31~D33. The diodes D31~D33 are connected in series to form a diode series. Here, an anode of the diode series, i.e. an anode of the diode D31, acts as a first end of the isolating circuit 121', and a cathode of the diode series, i.e. a cathode of the diode D33, acts as a second end of the isolating circuit 121'. As such, the diode series is switched on when the voltage level at the first end of the isolating circuit 121' is greater than the voltage level at the second end of the isolating circuit 121'. Thereby, the two ends of the isolating circuit 121' are conducted to each other.

Third Embodiment

Figure 4:
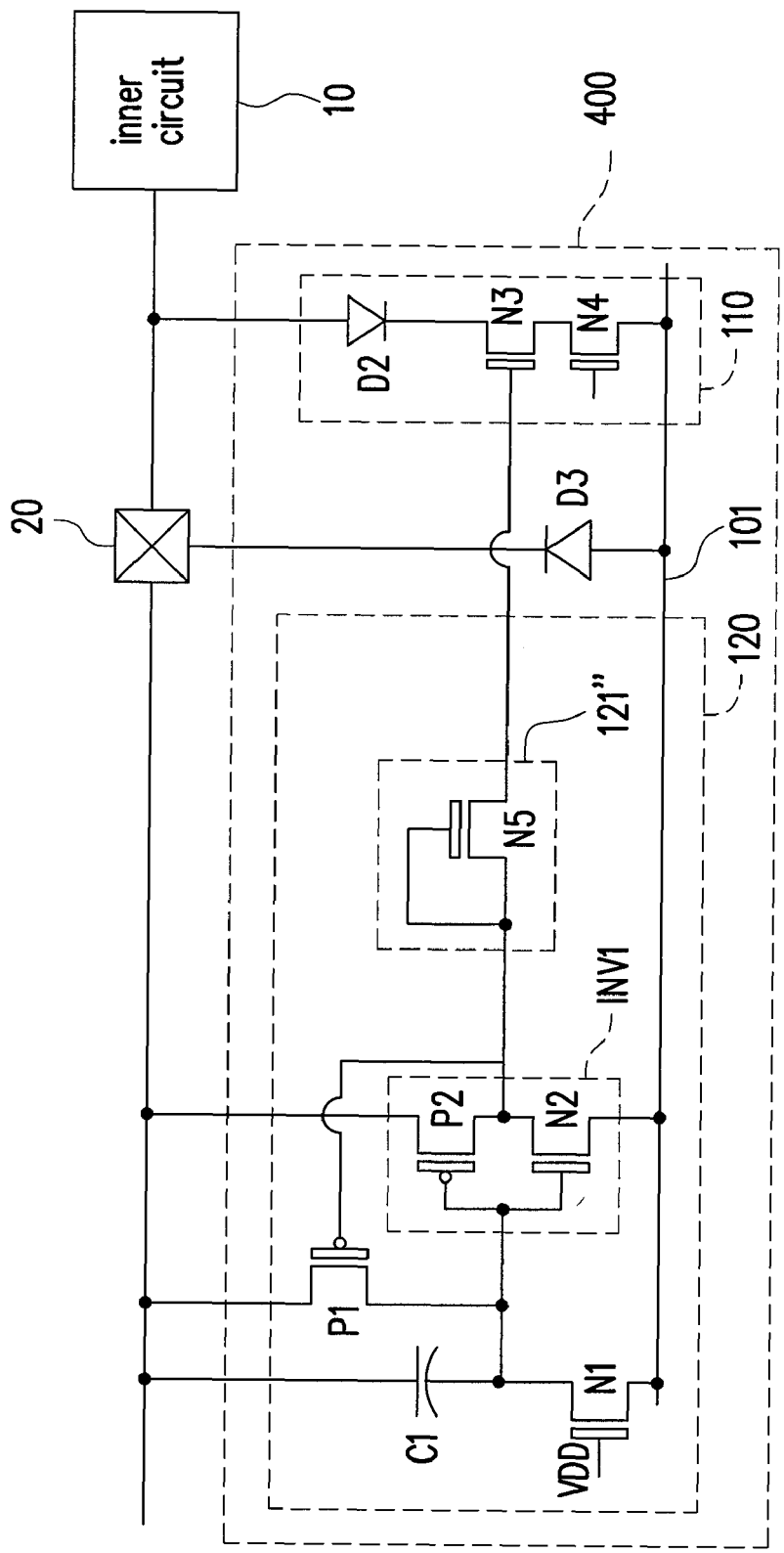
FIG. 4 is a schematic view illustrating a structure of an ESD protection device according to a third embodiment of the invention.

FIG. 4 is a schematic view illustrating a structure of an ESD protection device according to a third embodiment of the invention. Please refer to FIG. 4. This embodiment is substantially identical to the first embodiment, and the same or similar reference numbers used in this embodiment and in the first embodiment represent the same or similar elements. Accordingly, no further descriptions are provided in this embodiment.

The main difference between this embodiment and the first embodiment lies in that the isolating circuit 121" in the ESD protection device 400 as described in this embodiment is formed by an n-type transistor N5. A gate and a drain of the n-type transistor N5 are electrically connected, so as to form a first end of the isolating circuit 121", and a source of the n-type transistor N5 acts as a second end of the isolating circuit 121". As such, the n-type transistor N5 is switched on when the voltage level at the first end of the isolating circuit 121" is greater than the voltage level at the second end of the isolating circuit 121". Thereby, the two ends of the isolating circuit 121" are conducted to each other.

Fourth Embodiment

Figure 5:
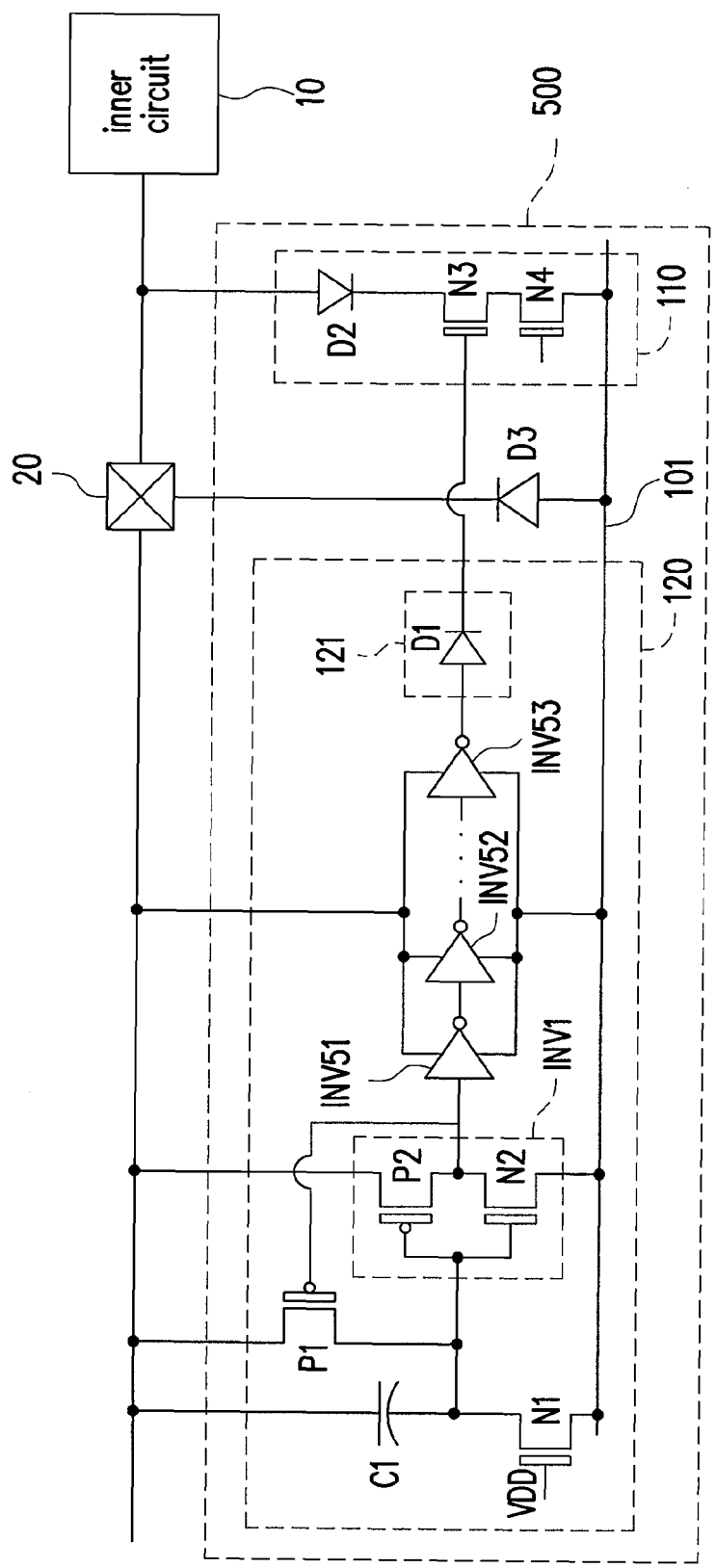
FIG. 5 is a schematic view illustrating a structure of an ESD protection device according to a fourth embodiment of the invention.

FIG. 5 is a schematic view illustrating a structure of an ESD protection device according to a fourth embodiment of the invention. Please refer to FIG. 5. This embodiment is substantially identical to the first embodiment, and the same or similar reference numbers used in this embodiment and in the first embodiment represent the same or similar elements. Accordingly, no further descriptions are provided in this embodiment.

The main difference between this embodiment and the first embodiment lies in that the ESD protection device 500 described in this embodiment further includes N inverters INV51~INV53, and N is an even number greater than 1. The inverters INV51~INV53 are disposed between the pad 20 and the ground line 101 and connected in series between the output end of the inverter INV1 and the first end of the isolating circuit 121.

Since the output end of the inverter INV1 is connected in series to the inverters INV51~INV53 in even number, signals output by the inverter INV53 and by the inverter INV1 are the same. Hence, the two ends of the isolating circuit 121 which is connected to the inverter INV53 are still conducted to each other when the inner circuit 10 operates, so as to pull the voltage level at the control end TM1 of the protection unit 110 up to the input voltage. When the inner circuit 10 does not operate, the two ends of the isolating circuit 121 are still not conducted to each other, such that the control end TM1 of the protection unit 110 is switched to the floating condition.

Fifth Embodiment

Figure 6:
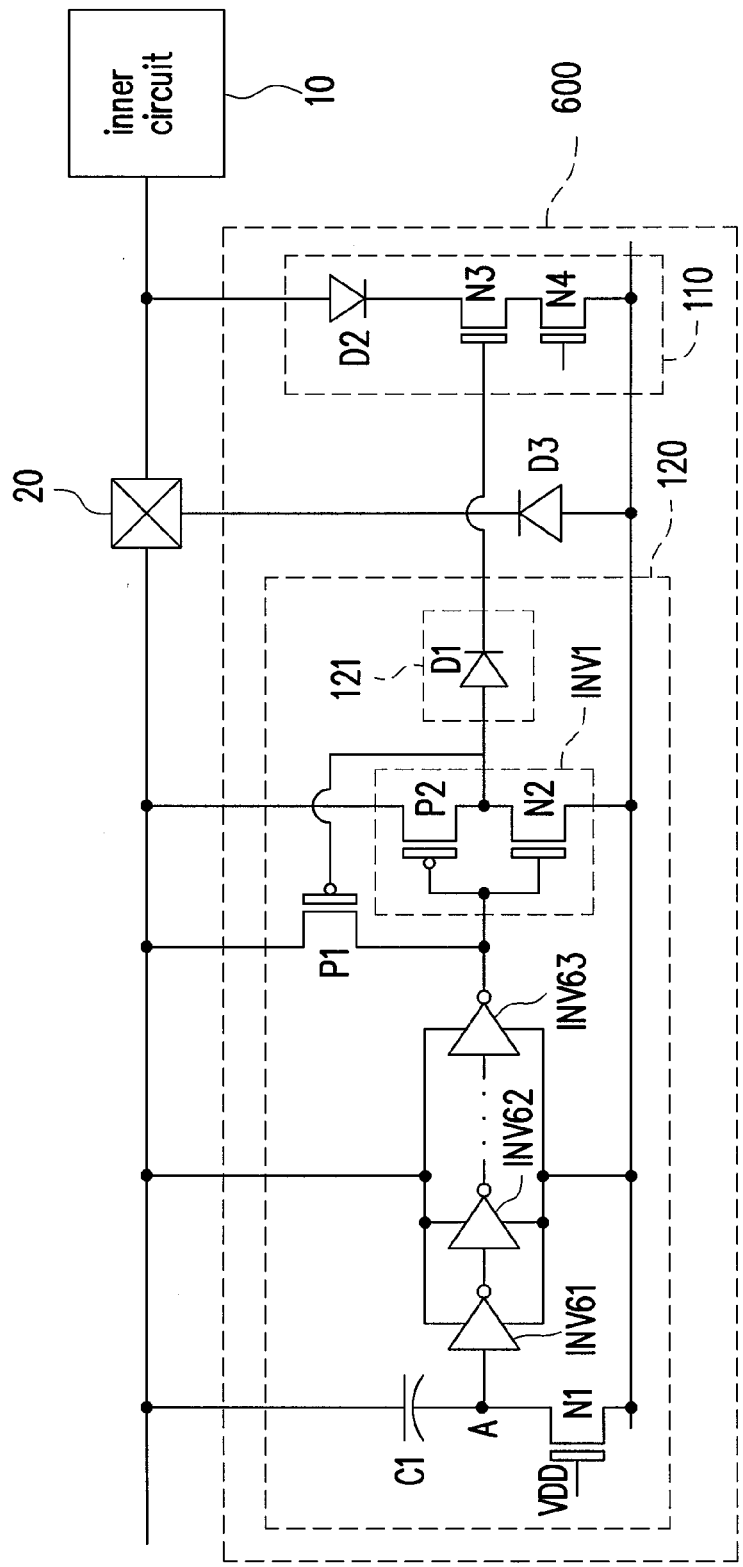
FIG. 6 is a schematic view illustrating a structure of an ESD protection device according to a fifth embodiment of the invention.

FIG. 6 is a schematic view illustrating a structure of an ESD protection device according to a fifth embodiment of the invention. Please refer to FIG. 6. This embodiment is substantially identical to the first embodiment, and the same or similar reference numbers used in this embodiment and in the first embodiment represent the same or similar elements. Accordingly, no further descriptions are provided in this embodiment.

The main difference between this embodiment and the first embodiment lies in that the ESD protection device 600 described in this embodiment further includes M inverters INV61~INV63, and M is an even number greater than 1. The inverters INV61~INV63 are disposed between the pad 20 and the ground line 101 and connected in series between the second end of the capacitor C1 and the input end of the inverter INV1.

Here, signals output by the serially-connected inverters INV61~INV63 in even numbers are the same as signals input to the serially-connected inverters INV61~INV63. In other words, signals received by the inverter INV61 are the same as signals output by the inverter INV63. Accordingly, the inverter INV1 connected to the inverter INV63 still receives a ground voltage when the inner circuit 10 operates, and the inverter INV1 still receives a high voltage corresponding to generation of the electrostatic signal when the inner circuit 10 does not operate.

Sixth Embodiment

Figure 7:
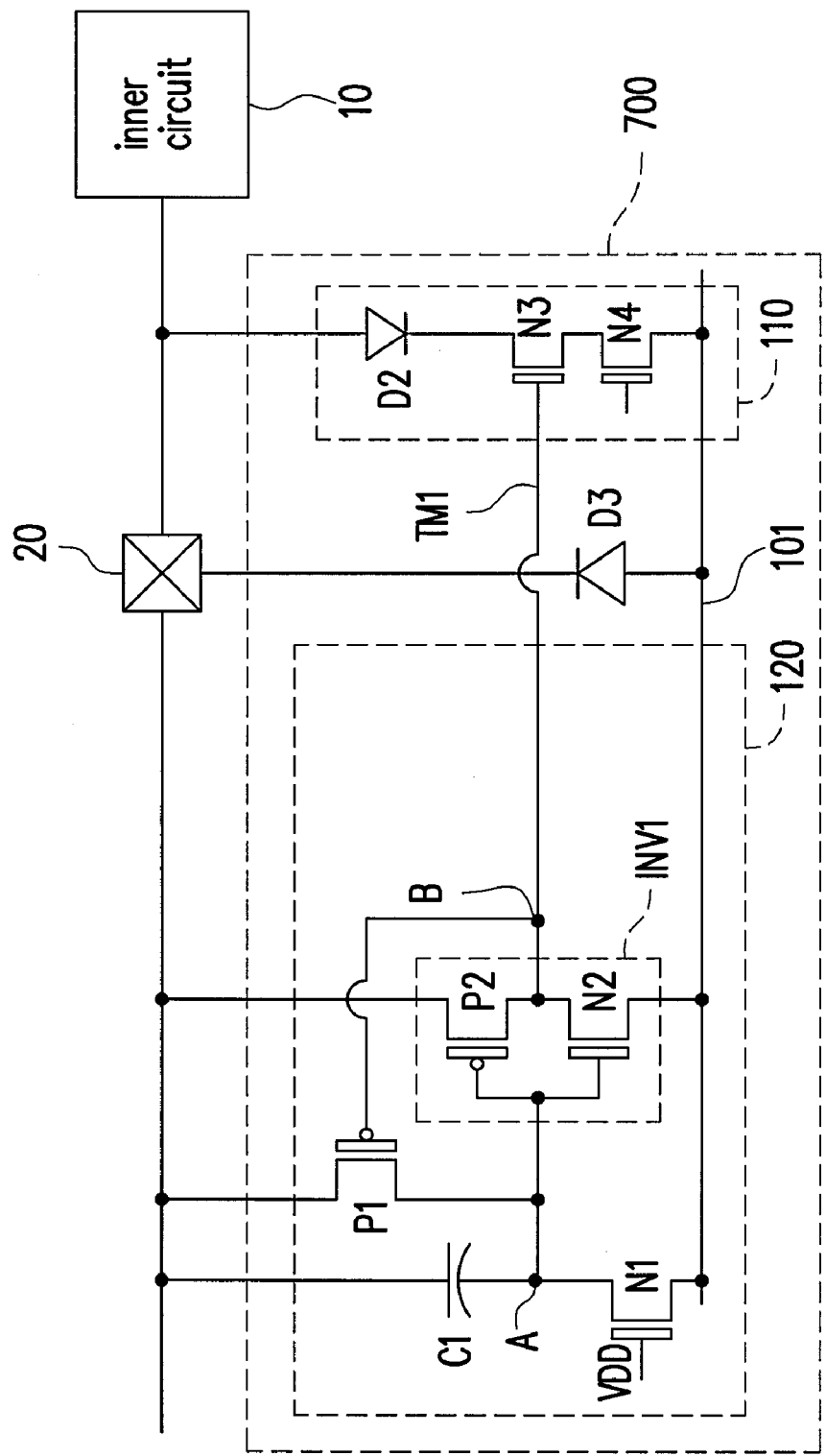
FIG. 7 is a schematic view illustrating a structure of an ESD protection device according to a sixth embodiment of the invention.

FIG. 7 is a schematic view illustrating a structure of an ESD protection device according to a sixth embodiment of the invention. Please refer to FIG. 7. This embodiment is substantially identical to the first embodiment, and the same or similar reference numbers used in this embodiment and in the first embodiment represent the same or similar elements. Accordingly, no further descriptions are provided in this embodiment.

The main difference between this embodiment and the first embodiment lies in that the isolating circuit 121 is removed in the ESD protection device 700 as described in this embodiment. Here, the output end of the inverter INV1 is directly and electrically connected to the control end TM1 of the protection unit 110. In practice, when the inner circuit 10 operates, the voltage level at the node A is pulled to the ground voltage, and the voltage level at the node B is pulled to the input voltage by operating the inverter INV1. As the voltage level at the control end TM1 is raised, the protection unit 110 correspondingly raises the holding voltage and the triggering voltage of the discharge path.

In another aspect, when the inner circuit 10 does not operate and the ESD occurs, the electrostatic signal is transmitted to the node A through the capacitor C1, and thereby the voltage level at the node A is pulled up to a high voltage. Besides, the voltage level at the node B is pulled down to the ground voltage by the inverter INV1. As such, the control end TM1 of the protection unit 110 is switched to a ground condition, and thereby the protection unit 110 correspondingly lowers the holding voltage and the triggering voltage of the discharge path.

Seventh Embodiment

Figure 8:
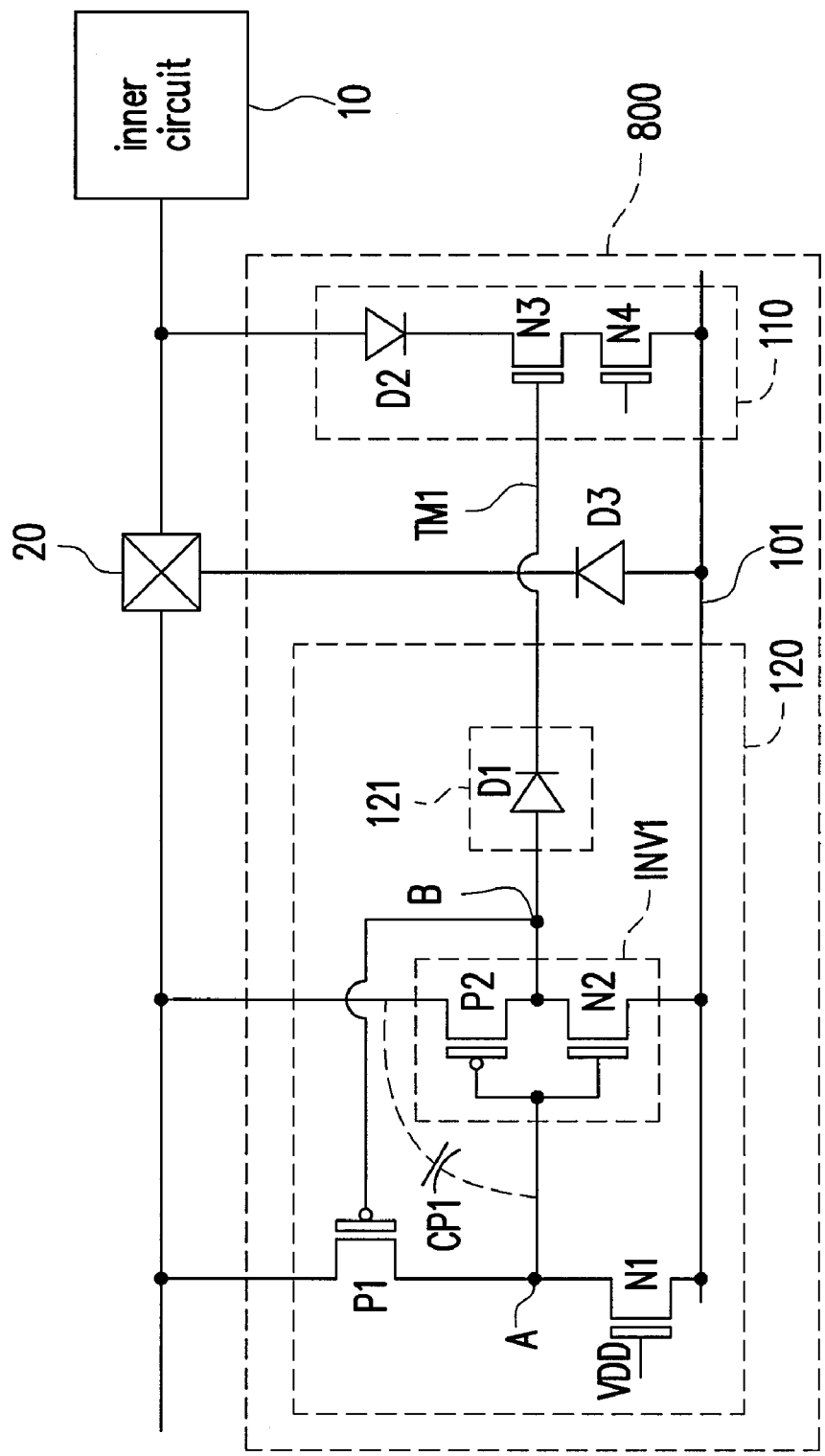
FIG. 8 is a schematic view illustrating a structure of an ESD protection device according to a seventh embodiment of the invention.

FIG. 8 is a schematic view illustrating a structure of an ESD protection device according to a seventh embodiment of the invention. Please refer to FIG. 8. This embodiment is substantially identical to the first embodiment, and the same or similar reference numbers used in this embodiment and in the first embodiment represent the same or similar elements. Accordingly, no further descriptions are provided in this embodiment.

The main difference between this embodiment and the first embodiment lies in that the capacitor C1 in FIG. 1 is replaced by a parasitical capacitor CP1 of the p-type transistor P2 in the ESD protection device 800 as described in this embodiment. Wherein, when the inner circuit 10 does not operate and the ESD occurs, the electrostatic signal is transmitted to the node A through the parasitical capacitor CP1. Besides, the voltage level at the node B is pulled down to the ground voltage by the inverter INV1. By contrast, the isolating circuit 121 does not conduct its first end and its second end, and thereby the control end TM1 of the protection unit 110 is constantly in the floating condition. As such, the holding voltage and the triggering voltage of the discharge path are lowered down correspondingly.

Eighth Embodiment

Figure 9:
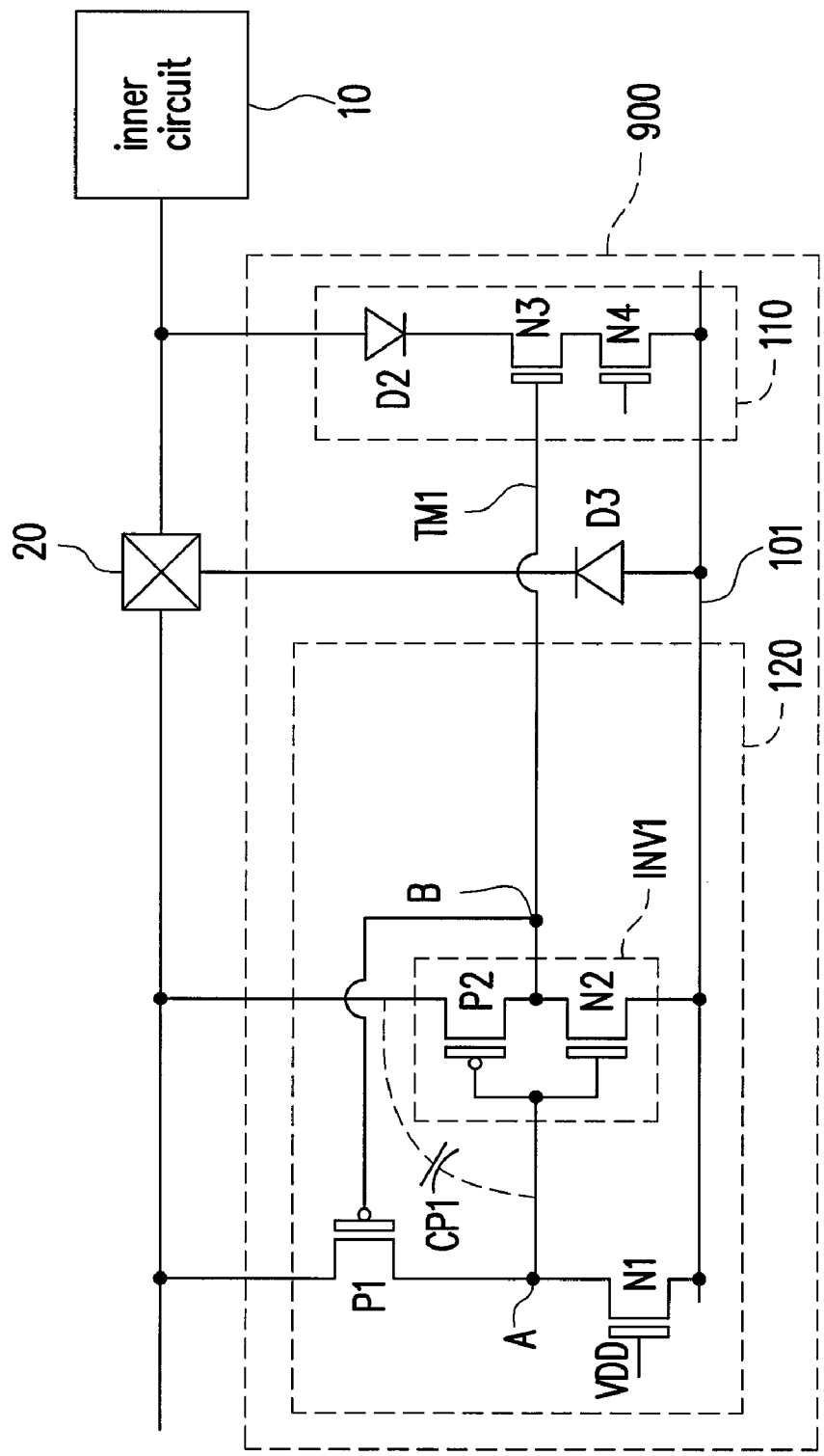
FIG. 9 is a schematic view illustrating a structure of an ESD protection device according to an eighth embodiment of the invention.

FIG. 9 is a schematic view illustrating a structure of an ESD protection device according to an eighth embodiment of the invention. Please refer to FIG. 9. This embodiment is substantially identical to the first embodiment, and the same or similar reference numbers used in this embodiment and in the first embodiment represent the same or similar elements. Accordingly, no further descriptions are provided in this embodiment.

The main difference between this embodiment and the first embodiment lies in that the isolating circuit 121 is removed, and the capacitor C1 in FIG. 1 is replaced by the parasitical capacitor CP1 of the p-type transistor P2 in the ESD protection device 900 as described in this embodiment. In other words, this embodiment is the combination of the sixth embodiment and the seventh embodiment and therefore detailed descriptions thereof are not repeated.

Ninth Embodiment

Figure 10:
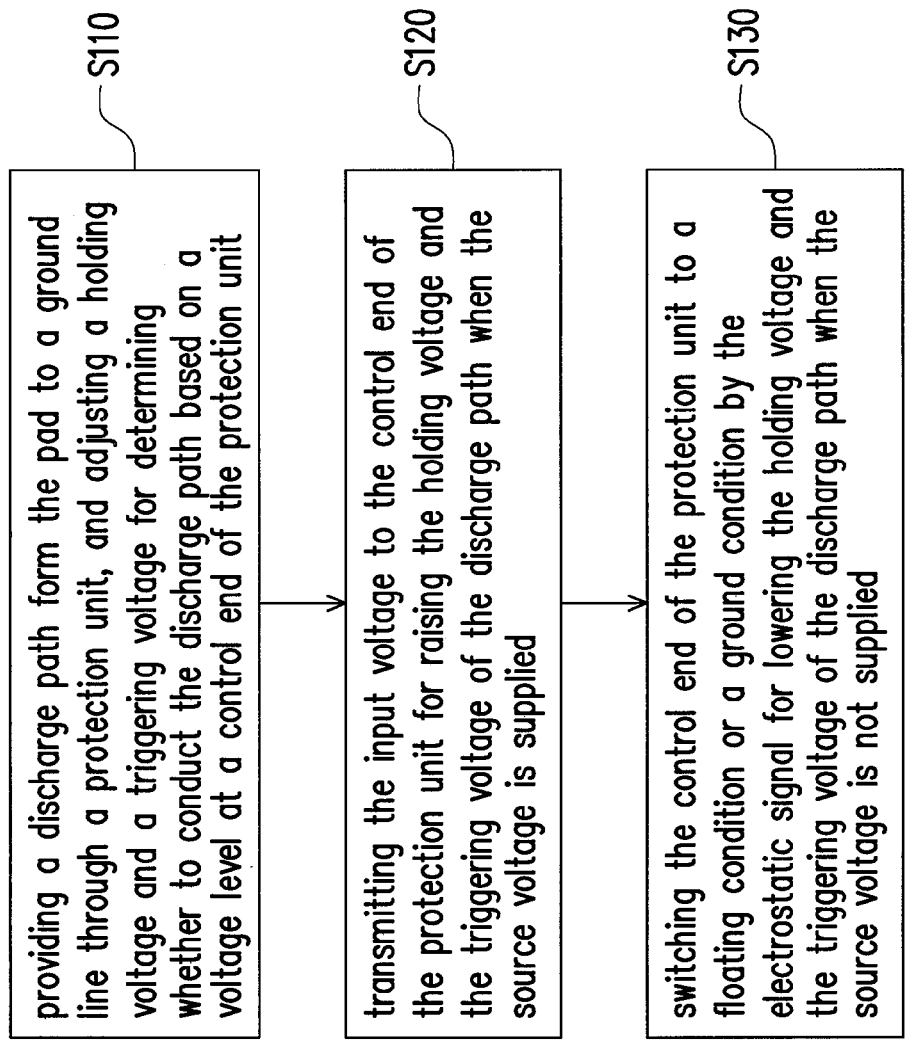
FIG. 10 is a flowchart illustrating an ESD protection method according to an embodiment of the invention.

FIG. 10 is a flowchart illustrating an ESD protection method according to an embodiment of the invention. The ESD protection method is used for protecting an inner circuit. Wherein, the inner circuit is operated in a source voltage and receives an input voltage through a pad. With reference to FIG. 10, the ESD protection method includes following steps. First, in step S110, a discharge path form the pad to a ground line is provided through a protection unit, and a holding voltage and a triggering voltage for determining whether to conduct the discharge path is adjusted based on a voltage level at a control end of the protection unit. In step S120, when the source voltage is supplied, the input voltage is transmitted to the control end of the protection unit, so as to raise the holding voltage and the triggering voltage of the discharge path. In step S130, when the source voltage is not supplied, the control end of the protection unit is switched to a floating condition or a ground condition by the electrostatic signal, so as to lower the holding voltage and the triggering voltage of the discharge path.

In light of the foregoing, the control unit is employed in this invention to control the holding voltage and the triggering voltage of the discharge path which is provided by the protection unit. When the source voltage is supplied, the voltage level at the control end of the protection unit is switched to the input voltage by the control unit, such that the protection unit raises the holding voltage and the triggering voltage of the discharge path. By contrast, when the source voltage is not supplied, the control end of the protection unit is switched to a floating condition, such that the protection unit lowers the holding voltage and the triggering voltage of the discharge path. As such, the ESD protection device of the invention can protect the inner circuit not only from being affected by electrostatic signals but also from being interfered by the EOS during operation of the inner circuit.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electrostatic discharge protection device for protecting an inner circuit, the inner circuit operated in a source voltage and receiving an input voltage through a pad, the electrostatic discharge protection device comprising:
a protection unit providing a discharge path transmitting an electrostatic signal from the pad to a ground line, the protection unit having a control end and adjusting a holding voltage and a triggering voltage for determining whether to conduct the discharge path based on a voltage level at the control end; and
a control unit transmitting the input voltage to the control end of the protection unit when the source voltage is supplied, such that the protection unit raises the holding voltage and the triggering voltage, the control unit switching the control end of the protection unit to a floating condition or a ground condition by the electrostatic signal when the source voltage is not supplied, such that the protection unit lowers the holding voltage and the triggering voltage, wherein the control unit comprises:
a first capacitor, a first end of the first capacitor being electrically connected to the pad;
a first n-type transistor, a drain of the first n-type transistor being electrically connected to a second end of the first capacitor, a source of the first n-type transistor being electrically connected to the ground line, a gate of the first n-type transistor receiving the source voltage;
a first inverter disposed between the pad and the ground line, an input end of the first inverter being electrically connected to the second end of the first capacitor; and
a first isolating circuit, a first end of the first isolating circuit being electrically connected to an output end of the first inverter, a second end of the first isolating circuit being electrically connected to the control end of the protection unit, the first end and the second end of the first isolating circuit being conducted when a voltage level at the first end of the first isolating circuit is greater than a voltage level at the second end of the first isolating circuit.

2. The electrostatic discharge protection device as claimed in claim 1, wherein the control unit further comprises:
a first p-type transistor, a source of the first p-type transistor being electrically connected to the pad, a drain of the first p-type transistor being electrically connected to the second end of the first capacitor, a gate of the first p-type transistor being electrically connected to an output end of the first inverter.

3. The electrostatic discharge protection device as claimed in claim 1, wherein the first inverter comprises:
a second p-type transistor, a source of the second p-type transistor being electrically connected to the pad, a drain of the second p-type transistor acting as the output end of the first inverter, a gate of the second p-type transistor acting as the input end of the first inverter; and
a second n-type transistor, a drain of the second n-type transistor being electrically connected to the drain of the second p-type transistor, a source of the second n-type transistor being electrically connected to the ground line, a gate of the second n-type transistor being electrically connected to the gate of the second p-type transistor.

4. The electrostatic discharge protection device as claimed in claim 1, wherein the first isolating circuit is formed by a first diode, an anode of the first diode acts as the first end of the first isolating circuit, and a cathode of the first diode acts as the second end of the first isolating circuit.

5. The electrostatic discharge protection device as claimed in claim 1, wherein the first isolating circuit is formed by a plurality of second diodes connected in series to form a diode series, an anode of the diode series acts as the first end of the first isolating circuit, and a cathode of the diode series acts as the second end of the first isolating circuit.

6. The electrostatic discharge protection device as claimed in claim 1, wherein the first isolating circuit is formed by a third n-type transistor, a gate and a drain of the third n-type transistor are electrically connected to each other to form the first end of the first isolating circuit, and a source of the third n-type transistor acts as the second end of the first isolating circuit.

7. The electrostatic discharge protection device as claimed in claim 1, further comprising:
N second inverters disposed between the pad and the ground line and connected in series between the output end of the first inverter and the first end of the first isolating circuit, wherein N is an even number greater than 1.

8. The electrostatic discharge protection device as claimed in claim 1, further comprising:
M third inverters disposed between the pad and the ground line and connected in series between the second end of the first capacitor and the input end of the first inverter, wherein M is an even number greater than 1.

9. The electrostatic discharge protection device as claimed in claim 1, wherein the protection unit comprises:
a third diode, an anode of the third diode being electrically connected to the pad and the inner circuit;
a fourth n-type transistor, a drain of the fourth n-type transistor being electrically connected to a cathode of the third diode, a gate of the fourth n-type transistor acting as the control end of the protection unit; and
a fifth n-type transistor, a drain of the fifth n-type transistor being electrically connected to a source of the fourth n-type transistor, a source of the fifth n-type transistor being electrically connected to the ground line, a gate of the fifth n-type transistor being coupled to the ground line.

10. The electrostatic discharge protection device as claimed in claim 1, further comprising:
a fourth diode, a cathode of the fourth diode being electrically connected to the pad, an anode of the fourth diode being electrically connected to the ground line.

11. An electrostatic discharge protection device for protecting an inner circuit, the inner circuit operated in a source voltage and receiving an input voltage through a pad, the electrostatic discharge protection device comprising:
a protection unit providing a discharge path transmitting an electrostatic signal from the pad to a ground line, the protection unit having a control end and adjusting a holding voltage and a triggering voltage for determining whether to conduct the discharge path based on a voltage level at the control end; and
a control unit transmitting the input voltage to the control end of the protection unit when the source voltage is supplied, such that the protection unit raises the holding voltage and the triggering voltage, the control unit switching the control end of the protection unit to a floating condition or a ground condition by the electrostatic signal when the source voltage is not supplied, such that the protection unit lowers the holding voltage and the triggering voltage, wherein the control unit comprises:
a third p-type transistor, a source of the third p-type transistor being electrically connected to the pad;
a sixth n-type transistor, a drain of the sixth n-type transistor being electrically connected to a drain of the third p-type transistor, a source of the sixth n-type transistor being electrically connected to the ground line, a gate of the sixth n-type transistor receiving the source voltage; and
a fourth inverter disposed between the pad and the ground line, an input end of the fourth inverter being electrically connected to the drain of the sixth n-type transistor, and an output end of the fourth inverter being electrically connected to a gate of the third p-type transistor and the control end of the protection unit.

12. The electrostatic discharge protection device as claimed in claim 11, wherein the control unit further comprises a second isolating circuit, and the output end of the fourth inverter is electrically connected to the control end of the protection unit through the second isolating circuit.

13. The electrostatic discharge protection device as claimed in claim 11, wherein the control unit further comprises a second capacitor, a first end of the second capacitor is electrically connected to the pad, and a second end of the second capacitor is electrically connected to the drain of the sixth n-type transistor.

14. An electrostatic discharge protection method for protecting an inner circuit, the inner circuit operated in a source voltage and receiving an input voltage through a pad, the electrostatic discharge protection method comprising:
providing a discharge path form the pad to a ground line through a protection unit, and adjusting a holding voltage and a triggering voltage for determining whether to conduct the discharge path based on a voltage level at a control end of the protection unit;
transmitting the input voltage to the control end of the protection unit for raising the holding voltage and the triggering voltage of the discharge path when the source voltage is supplied; and
switching the control end of the protection unit to a floating condition or a ground condition by the electrostatic signal for lowering the holding voltage and the triggering voltage of the discharge path when the source voltage is not supplied.

15. The method of claim 14, wherein the hold voltage and the triggering voltage are voltages are produced by a pair of parasitic lateral n-type bipolar junction transistors located in the discharge path with one of the n-type bipolar junction transistor having a gate shorted to ground.

* * * * *